(12) United States Patent
Xiao et al.

(10) Patent No.: US 12,596,514 B2
(45) Date of Patent: Apr. 7, 2026

(54) CONTROL METHOD AND CONTROL DEVICE

(71) Applicant: Lenovo (Beijing) Limited, Beijing (CN)

(72) Inventors: Chun Xiao, Beijing (CN); Zhipeng Yan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/693,416

(22) Filed: Mar. 14, 2022

(65) Prior Publication Data

US 2023/0091674 A1     Mar. 23, 2023

(30) Foreign Application Priority Data

Sep. 22, 2021   (CN) ........................... 202111107693.0

(51) Int. Cl.
*G06F 3/14*            (2006.01)

(52) U.S. Cl.
CPC ................................. *G06F 3/1423* (2013.01)

(58) Field of Classification Search
CPC ...... G06F 3/1423; G06F 3/1454; G06F 3/067;
G06F 3/065; G09G 5/12; H04L 67/1097;
H04L 67/1095; H04L 67/10; H04L
65/612; H04L 65/611; Y02D 30/70;
Y02D 10/00; Y02D 30/00; H04W 4/80
See application file for complete search history.

(56) References Cited

U.S. PATENT DOCUMENTS

| | | | |
|---|---|---|---|
| 8,271,662 B1 * | 9/2012 | Gossweiler, III | H04W 4/80 |
| | | | 709/227 |
| 10,114,522 B2 * | 10/2018 | Park | H04N 21/4126 |
| 2014/0026068 A1 * | 1/2014 | Park | H04N 21/41265 |
| | | | 715/748 |
| 2014/0125575 A1 * | 5/2014 | Samanta Singhar | G06F 3/038 |
| | | | 345/156 |
| 2016/0014714 A1 * | 1/2016 | Patil | H04W 68/005 |
| | | | 455/458 |
| 2016/0350058 A1 * | 12/2016 | Zhu | H04N 21/4126 |
| 2017/0013153 A1 * | 1/2017 | Shin | G06F 3/1203 |
| 2017/0013562 A1 * | 1/2017 | Lim | H04M 1/725 |
| 2017/0160882 A1 * | 6/2017 | Park | G06F 3/0346 |
| 2017/0230710 A1 * | 8/2017 | Cha | H04N 21/43078 |
| 2017/0311025 A1 * | 10/2017 | Kim | G06F 3/1454 |
| 2017/0322763 A1 * | 11/2017 | Zhao | G06F 3/1423 |
| 2019/0250759 A1 * | 8/2019 | Chung | G06F 3/0488 |
| 2020/0042274 A1 * | 2/2020 | Park | G09G 5/12 |
| 2020/0073629 A1 * | 3/2020 | Lee | G06F 3/167 |
| 2021/0360145 A1 * | 11/2021 | Laurans | H04N 23/611 |
| 2022/0229352 A1 * | 7/2022 | Yue | H04N 9/3173 |

\* cited by examiner

*Primary Examiner* — Sujit Shah
(74) *Attorney, Agent, or Firm* — ANOVA LAW GROUP, PLLC

(57)            ABSTRACT

A control method includes, after establishing a first connection with a content source provider, controlling a wireless projection module of an electronic apparatus to switch from a first state to a second state to display a first content that is input by the content source provider to a display screen of the electronic apparatus. Power consumption of the wireless projection module in the first state is lower than power consumption of the wireless projection module in the second state.

17 Claims, 5 Drawing Sheets

Button

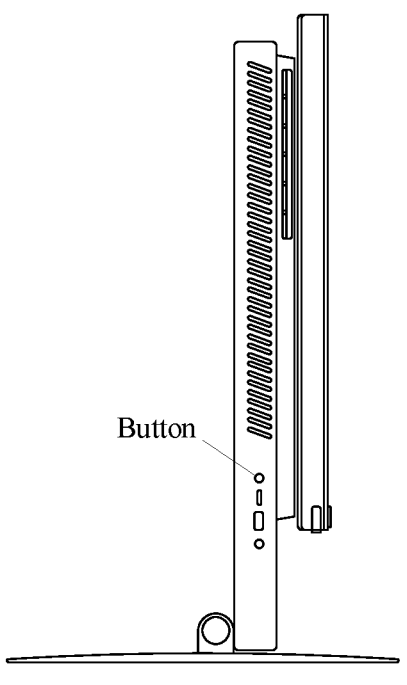

FIG. 1

After establishing the first connection with the at least one content source provider, control the wireless projection module of the electronic apparatus to switch from the first state to the second state to display the at least one first content source that is input by the at least one content source provider to the display screen of the electronic apparatus

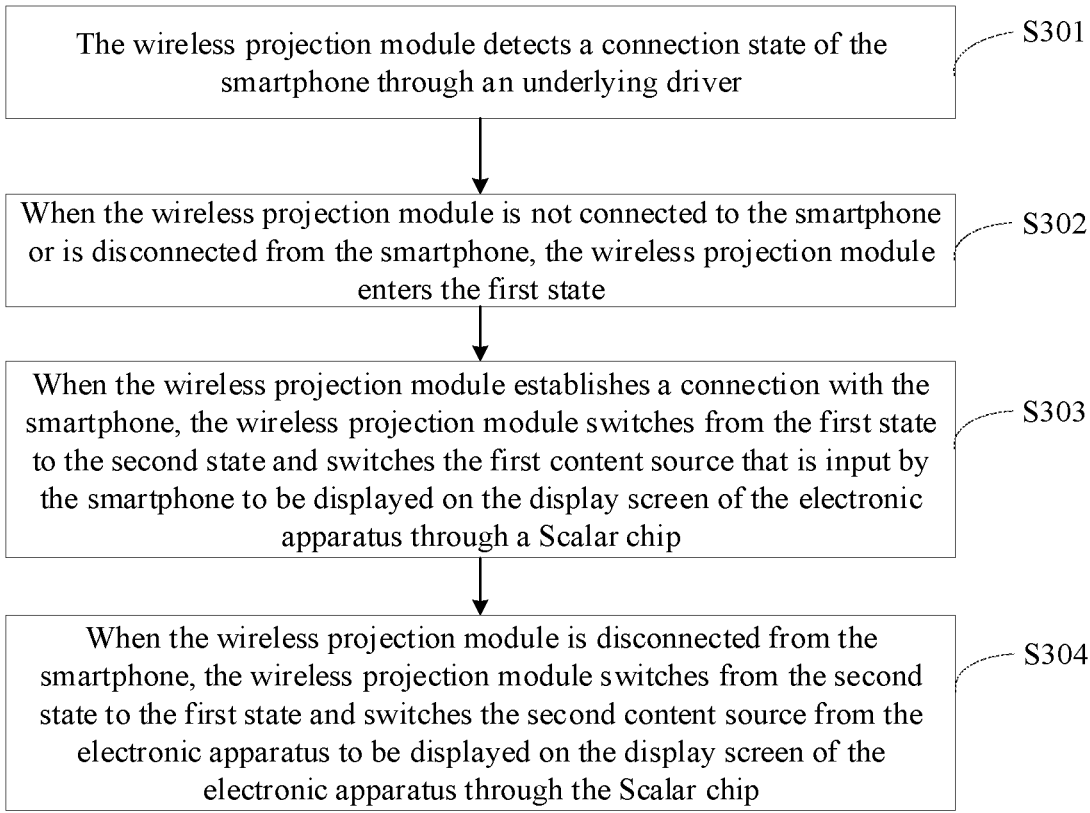

| The wireless projection module detects a connection state of the smartphone through an underlying driver | S301 |

↓

| When the wireless projection module is not connected to the smartphone or is disconnected from the smartphone, the wireless projection module enters the first state | S302 |

↓

| When the wireless projection module establishes a connection with the smartphone, the wireless projection module switches from the first state to the second state and switches the first content source that is input by the smartphone to be displayed on the display screen of the electronic apparatus through a Scalar chip | S303 |

↓

| When the wireless projection module is disconnected from the smartphone, the wireless projection module switches from the second state to the first state and switches the second content source from the electronic apparatus to be displayed on the display screen of the electronic apparatus through the Scalar chip | S304 |

FIG. 3

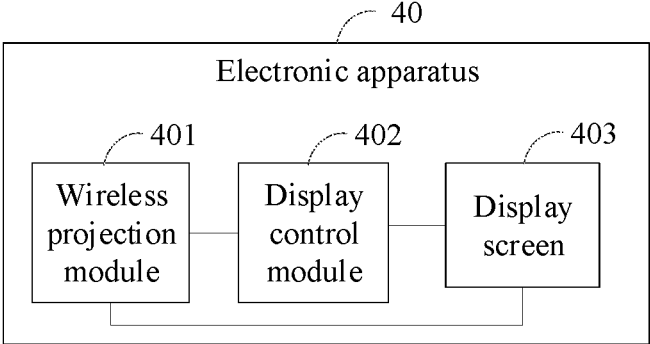

40

Electronic apparatus

| Wireless projection module 401 | Display control module 402 | Display screen 403 |

FIG. 4

CONTROL METHOD AND CONTROL DEVICE

CROSS-REFERENCE TO RELATED APPLICATION

This application claims priority to Chinese Patent Application No. 202111107693.0, filed on Sep. 22, 2021, the entire content of which is incorporated herein by reference.

TECHNICAL FIELD

The present disclosure generally relates to the wireless projection technology field and, more particularly, to a control method and control device.

BACKGROUND

With the continuous development of electronic technology, a mobile apparatus such as a smart phone has become an essential apparatus for daily life, entertainment, and work of people. The number of applications (APP) such as online shopping, entertainment, and education applications that adapt to the Android system are far more than the number of APPs of a computer that adapt to the Windows system. However, the mobile apparatus has a small screen, which has negative effects on user's eyes with long-term use.

A computer has an advantage of a large screen. Therefore, the screen of the mobile apparatus such as the smart phone can be projected to the computer through wireless projection technology. A current projection solution requires a user to operate a button to switch screens. Such a manual triggering of the projection method is cumbersome to use and impairs user experience.

SUMMARY

Embodiments of the present disclosure provide a control method. The method includes, after establishing a first connection with a content source provider, controlling a wireless projection module of an electronic apparatus to switch from a first state to a second state to display a first content that is input by the content source provider to a display screen of the electronic apparatus. Power consumption of the wireless projection module in the first state is lower than power consumption of the wireless projection module in the second state.

Embodiments of the present disclosure provide a control device, including a control module. The control module is configured to, after establishing a first connection with a content source provider, control a wireless projection module of an electronic apparatus to switch from a first state to a second state to display a first content that is input by the content source provider to a display screen of the electronic apparatus. Power consumption of the wireless projection module in the first state is lower than power consumption of the wireless projection module in the second state.

Embodiments of the present disclosure provide an electronic apparatus, including a control device. The control device includes a control module. The control module is configured to, after establishing a first connection with a content source provider, control a wireless projection module of an electronic apparatus to switch from a first state to a second state to display a first content that is input by the content source provider to a display screen of the electronic apparatus. Power consumption of the wireless projection module in the first state is lower than power consumption of the wireless projection module in the second state.

BRIEF DESCRIPTION OF THE DRAWINGS

The following drawings are merely examples for illustrative purposes according to various disclosed embodiments and are not intended to limit the scope of the present disclosure.

FIG. 1 illustrates a schematic appearance structural diagram of an electronic apparatus according to related technology.

FIG. 2 illustrates a schematic flowchart of a control method according to some embodiments of the present disclosure.

FIG. 3 illustrates a schematic detailed flowchart of a control method according to some embodiments of the present disclosure.

FIG. 4 illustrates a schematic structural diagram showing hardware of an electronic apparatus according to some embodiments of the present disclosure.

DETAILED DESCRIPTION OF THE EMBODIMENTS

Figure 5:
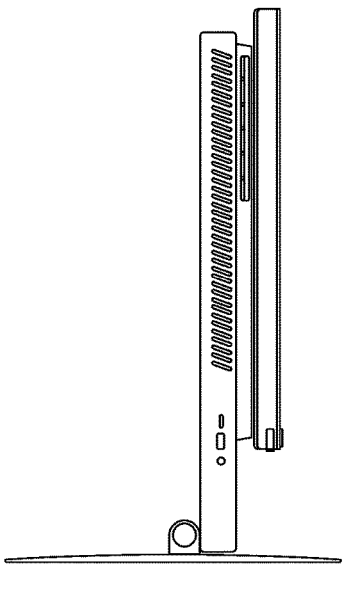
FIG. 5 illustrates a schematic appearance structural diagram of an electronic apparatus according to some embodiments of the present disclosure.

The technical solutions of embodiments of the present disclosure are described in detail below with reference to the accompanying drawings of embodiments of the present disclosure. Specific embodiments described herein are merely used to explain the present disclosure but not to limit the present disclosure. In addition, to facilitate description, the accompanying drawings merely show only parts related to the present disclosure.

Unless otherwise defined, all technical and scientific terms used herein have the same meaning as commonly understood by those of ordinary skill in the art. The terms used herein are only for the purpose of describing embodiments of the present disclosure and are not intended to limit the present disclosure.

In the following description, "some embodiments" describe a subset of all possible embodiments. "some embodiments" can be a same subset or different subsets of all possible embodiments, and can be combined with each other when there is no conflict.

The term "first\second\third" involved in embodiments of the present disclosure is only to distinguish similar objects and does not represent a specific order of the objects. As allowed, a specific order or sequence of "first\second\third" may be interchanged to enable embodiments of the present disclosure described herein to be practiced in sequences other than those illustrated or described herein.

In the existing technology, with the continuous development of electronic technology, a mobile apparatus such as a smart phone has become an essential apparatus for daily life, entertainment, and work of people. A number and updates of applications (APP) such as online shopping, entertainment, and education that adapt to the Android system are far more than a number and update of APPs of a computer that adapt to the Windows system. APPs that adapt to computers are not well developed. Thus, many APPs can only adapt to the mobile apparatus with the Android system installed. However, due to the small screen of the mobile apparatus, eyes will be negatively affected with long-time use.

As people pay more attention to health, and the computer has an advantage of a large screen. Therefore, the computer needs to be able to perform intelligent and automatic switch with an intelligent wireless projection module to realize apparatus sharing. The intelligent wireless projection module can also support the projection when the computer is turned off. Thus, the existing intelligent wireless projection module has brought refreshing products to the market and users. However, in the existing technology, a current projection solution requires the user to operate a button to switch the screen. As shown in FIG. 1, a method of manually triggering the projection is cumbersome to operate, which impairs user experience. In addition, the method of manually triggering the projection also increases cost and affects industrial design (ID).

Embodiments of the present application provide a control method. A basic idea of the method includes after establishing a first connection with at least a content source provider, controlling a wireless projection module of an electronic apparatus to switch from a first state to a second state to display at least one first content source that is input by the at least one content source provider to a display screen of the electronic apparatus. Power consumption of the wireless projection module in the first state may be lower than power consumption of the wireless projection module in the second state. As such, by detecting whether a connection is established with the content source provider, wireless projection of the electronic apparatus may be realized. Thus, the problem of a cumbersome operation caused by manually triggering the projection may be solved, which can not only reduce cost but also increase user experience of the wireless projection. Efficiency of the wireless projection may also be improved.

Embodiments of the present disclosure are described in detail below with reference to the accompanying drawings.

In embodiments of the present disclosure, FIG. 2 illustrates a schematic flowchart of a control method according to some embodiments of the present disclosure. As shown in FIG. 2, the method includes the following steps.

At S201, after establishing the first connection with the at least one content source provider, the wireless projection module of the electronic apparatus is controlled to switch from the first state to the second state to display the at least one first content source that is input by the at least one content source provider to the display screen of the electronic apparatus.

The control method of embodiments of the present disclosure may be applied to a control device or an electronic apparatus integrated with the control device. The electronic apparatus may include an apparatus having a display device such as a display screen, such as an all-in-one computer (AIO), a personal computer (PC), a laptop computer, a personal digital assistant (PDA), a portable multimedia player (PMP), a smartphone, a smart TV, an electronic whiteboard, a monitor, etc. In embodiments of the present disclosure, the AIO is taken as an example to describe the specific implementation of embodiments of the present disclosure.

In embodiments of the present disclosure, the electronic apparatus may include a wireless projection module. The wireless projection module may be configured to display the at least one first content source that is input by the at least one content source provider to the display screen of the electronic apparatus. Thus, the user can watch through the display screen of the electronic apparatus.

For the wireless projection module, the wireless projection module can be in the first state (e.g., a sleep state, a shutdown state, etc.) or in the second state (e.g., a power-on state, a running state, etc.). As such, when the wireless projection module does not establish the first connection with any content source provider, the wireless projection module can be in the first state. When the wireless projection module establishes the first connection with at least one content source provider, the wireless projection module may be automatically woken up to be in the second state. That is, after the wireless projection module establishes the first connection with at least one content source provider, the wireless projection module will be caused to switch from the first state to the second state. In embodiments of the present disclosure, the power consumption of the wireless projection module in the first state may be lower than the power consumption of the wireless projection module in the second state.

In some embodiments, for establishing a communication connection between the wireless projection module and the at least one content source provider, the method may further include establishing a second connection with at least one content source provider using the first connection. The power consumption of the electronic apparatus in the first connection may be lower than the power consumption of the electronic apparatus in the second connection. In some other embodiments, the method may further include establishing the second connection with at least one content source provider to establish the first connection by using the second connection. The power consumption of the electronic apparatus in the second connection may be lower than the power consumption of the electronic apparatus in the first connection.

For a sequence of establishing the connection, the first connection may be established with at least one content source provider first. Then, the second connection may be established with at least one content source provider by using the first connection. In some other embodiments, the second connection may be established with at least one content source provider first. Then, the first connection may be established with at least one content source provider by using the second connection, which is not limited.

The first connection may be different from the second connection. The first connection may be a Bluetooth (BT) connection, and the second connection may be a Wireless Fidelity (WIFI) connection. In some other embodiments, the first connection may be a WIFI connection, and the second connection may be a Bluetooth connection, which is not limited here. In embodiments of the present disclosure, two specific implementations for establishing the connection are described below in combination with the Bluetooth connection and the WIFI connection:

In some embodiments, after establishing the Bluetooth connection with at least one content source provider, the wireless projection module may be controlled to switch from the first state to the second state. Then, the WIFI connection may be established with the at least one content source provider through the Bluetooth connection to display the content that is input by the at least one content source provider to the display screen of the electronic apparatus. The terminal establishes a WIFI connection so as to display the content source input by the at least one content source providing terminal to the display screen of the electronic apparatus.

In some other embodiments, the Bluetooth connection may be established with the at least one content source provider. After establishing the WIFI connection with the at least one content source provider through the Bluetooth connection, the wireless projection module may be controlled to switch from the first state to the second state to display the content that is input by the at least one content source provider to the display screen of the electronic apparatus.

Further, after the communication connection is established between the wireless projection module and the at least one content source provider, for a determination logic of triggering the wireless projection module to switch from the first state to the second state, in some embodiments, the method may further include obtaining an input operation acting on the electronic apparatus, and if the input operation is related to establishment of the first connection and/or the second connection, controlling the wireless projection module of the electronic apparatus to switch from the first state to the second state. In some other embodiment, the method may further include obtaining communication content information between the at least one content source provider and the electronic apparatus and controlling the wireless projection module of the electronic apparatus to switch from the first state to the second state or maintaining the wireless projection module of the electronic apparatus in the first state.

After the communication connection is established, whether the communication connection is used for wireless projection may be determined by considering some auxiliary operations.

In some embodiments, an auxiliary operation may be an input operation acting on the electronic apparatus. The input operation may include an input operation such as virtual button pressing or a user gesture. In some embodiments, the input operation acting on the electronic apparatus is obtained. If an association relationship exists between the input operation and the establishment of the first connection and/or the second connection, for example, a sequential relationship in a time sequence or a triggering relationship, then the wireless projection module may be controlled to switch from the first state to the second state. In some other embodiments, after the input operation acting on the electronic apparatus is obtained, the wireless screen projection module may be controlled to switch from the first state to the second state.

In some other embodiments, the auxiliary operation may be the communication content information between the at least one content source provider and the electronic apparatus. In some embodiments, if the communication content information between the at least one content source provider and the electronic apparatus is obtained, for example, the communication content information may indicate that the communication connection established above is for the wireless projection rather than hotspot sharing, then, the wireless projection may be controlled to switch from the first state to the second state or remain in the first state.

Further, in some embodiments, the method may further include controlling an operation state of the electronic apparatus to display the at least one first content source that is input by the at least one content source provider to the display screen of the electronic apparatus.

In embodiments of the present disclosure, controlling the operation state of the electronic apparatus may include at least one of controlling the operation state of the electronic apparatus based on a type of the electronic apparatus and/or a state of the display screen or controlling the operation state of the electronic apparatus based on input information acting on the electronic apparatus.

The operation state of the electronic apparatus may be controlled according to the type of the electronic apparatus, such as a monitor, an AIO, an electronic whiteboard, a smart TV, etc., or according to the state of the display screen of the electronic apparatus, such as a black screen state, a bright screen state, etc., or according to the input information acting on the electronic apparatus, such as a connection input, an operation input, a content source input, etc.

In some embodiments, controlling the operation state of the electronic apparatus based on the type of the electronic apparatus and/or the display screen state may include, if the display screen of the electronic apparatus is in a third state, controlling the display screen of the electronic apparatus to switch from the third state to a fourth state to display the first content source to the display screen. Power consumption of the display screen in the third state may be lower than power consumption of the display screen in the fourth state.

In some other embodiments, controlling the operation state of the electronic apparatus based on the type of the electronic apparatus and/or the display screen state may include, if the display screen of the electronic apparatus is in the fourth state, obtaining type information of the electronic apparatus to control the display screen of the electronic apparatus to display the first content source based on the type information.

In some other embodiments, controlling the operation state of the electronic apparatus based on the type of the electronic apparatus and/or the display screen state may include controlling the display screen of the electronic apparatus to switch from displaying and outputting a second content source to at least displaying and outputting the first content source. The second content source may be from the electronic apparatus, and the first content source may be from the content source provider.

The display screen of the electronic apparatus may have the third state and the fourth state. The third state may refer to the black screen state, in which the electronic apparatus may be in a shutdown state or a sleep state. The fourth state may refer to the bright screen state, in which the electronic apparatus may be in a powered-on state or an operation state. Since the power consumption of the display screen in the bright screen state is higher than the power consumption of the display screen in the black screen state, the power consumption of the display screen in the third state is lower than the power consumption of the display screen in the fourth state.

For example, if the display screen of the electronic apparatus is in the black screen state, after the wireless projection module establishes the first connection with the at least one content source provider, the display screen of the electronic apparatus may be controlled to switch from the black screen state to the bright screen state and then display and output the first content source to the display screen.

For example, if the display screen of the electronic apparatus is in the bright screen state, when the electronic apparatus is a monitor, the display screen of the electronic apparatus may be controlled to display the first content source. In some other embodiments, when the electronic apparatus is an AIO, the display screen of the electronic apparatus may be controlled to switch from displaying and outputting the second content source to at least displaying and outputting the first content source (with a split-screen, the first content source and the second content source may be displayed simultaneously). The first content source may be from the content source provider. The second content source may be from the electronic apparatus (i.e., a current interface content before switching the display screen).

In some embodiments, the electronic apparatus is turned off. After the wireless projection module establishes the first connection with at least one content source provider, the electronic apparatus may be controlled to turn on, and then the first content source may be displayed to the display screen. In some other embodiments, the electronic apparatus is powered on. When the electronic apparatus is a monitor, the display screen of the electronic apparatus may be controlled to display the first content source. When the electronic apparatus is an AIO, a first display switch command may be sent to a display controller through the wireless projection module. Then, the display screen of the electronic apparatus may be controlled by the display controller to switch content according to the first display switch command. Thus, the display screen of the electronic apparatus may switch from displaying and outputting the second content source to at least displaying and outputting the first content source.

In some other embodiments, controlling the operation state of the electronic apparatus based on the input information acting on the electronic apparatus may include controlling the display screen of the electronic apparatus to switch from the fourth state to the split-screen state based on the content source information that is input by the at least one content source provider and/or a split-screen operation acting on the electronic apparatus to display the at least one first content source to a split-screen area of the display screen.

In some other embodiments, controlling the operation state of the electronic apparatus based on the input information acting on the electronic apparatus may include controlling the display screen of the electronic apparatus to display the first content source based on the connection request information that is input by the at least one content source provider.

In some other embodiments, controlling the operation state of the electronic apparatus based on the input information acting on the electronic apparatus may include controlling the display screen of the electronic apparatus to switch from displaying and outputting the second content source to at least displaying and outputting the first content source. The second content source may be from the electronic apparatus. The first content source may be from the content source provider.

In embodiments of the present disclosure, the operation state of the electronic apparatus may also be controlled according to the input information such as a connection input, an operation input, and a content source input. In some embodiments, from a split-screen perspective, the display screen of the electronic apparatus may be controlled to switch from the bright screen state to the split-screen state based on the content source information that is input by the at least one content source provider and/or the split-screen operation acting on the electronic apparatus. Then, the at least one first content source is displayed to the split-screen area of the display screen. In some other embodiments, from an apparatus type perspective, for the monitor, the display screen of the electronic apparatus may be controlled to display the first content source based on the connection request information that is input by the at least one content source provider. For an AIO, the display screen of the electronic apparatus may be controlled to switch from displaying and outputting the second content source to at least displaying and outputting the first content source (in the split-screen state, the first display content source and the second content source can be simultaneously displayed), which is not limited here.

Further, for a split-screen scenario, in some embodiments, controlling the display screen of the electronic apparatus to switch from the fourth state to the split-screen state based on the content source information that is input by at least one content source provider and/or the split-screen operation acting on the electronic apparatus may include:

if an input of the at least one content source provider is obtained, dividing an output area of the display screen into at least two display areas based on a number and/or resolution of the first content sources that are input by the at least one content source provider; or if a display screen division operation is obtained, determining that the screen split operation of the electronic apparatus is obtained and dividing the output area of the display screen into at least two display areas based on the display screen division operation; or if an operation of creating at least two desktops on the display screen is obtained, determining that the split-screen operation of the electronic apparatus is obtained and dividing the output area of the display screen into at least two display areas; or if an operation of switching display resolution of the display screen is obtained, determining that the split-screen operation of the electronic apparatus is obtained and dividing the output area of the display screen into at least two display areas; or if inputs of at least two content sources are obtained, and a division operation acting on the display screen is obtained, determining that the screen division operation of the electronic apparatus is obtained and dividing the output area of the display screen into at least two display areas based on the division operation.

In embodiments of the present disclosure, whether the split-screen operation of the electronic apparatus is obtained can be determined based on various methods. The output area of the display screen can be correspondingly divided based on the obtained split-screen operation.

In some embodiments, the input of the at least one content source provider may be obtained. For example, a content source that is input by the electronic apparatus and a content source that is input from at least one external apparatus (such as a smartphone, a tablet computer, a laptop, etc.) may be obtained, respectively. Then, the output area of the display screen may be divided into at least two display areas corresponding to the at least two content sources based on the attribute information of the content sources. The attribute information of the content sources may include the number and/or the resolutions of the content sources and may even include a source of the content sources, an input method of the content source, etc., which is not limited herein.

In some other embodiments, if the display screen division operation is obtained, the split-screen operation may be determined to be obtained. The display screen division operation may at least include a touch control operation for the display screen, a pressing trajectory operation, and an operation for selecting a touch control option etc., and even a user audio input or a user gesture input, etc. After the display screen division operation is obtained, the output area of the display screen may be correspondingly divided based on the display screen division operation to obtain at least two display areas.

In some other embodiments, if the operation of creating at least two desktops on the display screen is obtained, the split-screen operation may be determined to be obtained. The output area of the display screen may be divided into the at least two display areas according to the at least two desktops that are created. The at least two desktops may be used as independent display desktops. That is, the at least two desktops may have the same display level and may not have a parent-child relationship.

In some other embodiments, if the operation of switching the display resolution of the display screen is obtained, the split-screen operation may be determined to be obtained. The output area of the display screen may be divided into the at least two display areas. Since the display resolution of the display screen is switched, for example, from 3840×2160 to 2880×2160, an area of the display screen that does not display a picture (such as a black border or a white border area) may also be used as a split-screen area.

In some other embodiments, if inputs of the at least two content sources are obtained, and the division operation acting on the display screen is also obtained, e.g., one or more division operations acting on the display screen listed above, the split-screen operation may be determined to be obtained. The output area of the display screen may be divided at least based on the division operation to obtain the at least two display areas.

That is, in embodiments of the present disclosure, the output area of the display screen may be divided based on a plurality of different references, such as the content source input and/or the division operation. Thus, the output area of the display screen may be divided into the at least two display areas.

Further, when the output area of the display screen is divided, dividing the output area of the display screen into the at least two display areas based on the attribute information of the content source may include dividing the output area of the display screen into the at least two display areas based on the number or the resolutions of content sources, or the target information of the content source provider, such that a sum of the resolutions of the at least two display areas is less than or equal to the resolution of the display screen.

Dividing the output area of the display screen into the at least two display areas based on the display screen division operation may include diving the output area of the display screen is divided into the at least two display areas based on an operation trajectory acting on the display screen, a selection operation acting on a split-screen controller of the display screen, or the audio input and/or the gesture input. Thus, the sum of the resolutions of the at least two display areas is less than or equal to the resolution of the display screen. The split-screen controller may be displayed in an on-screen display (OSD) window or a system application window on the display screen.

When the output area of the display screen is divided based on the attribute information of the content source, the output area of the display screen may be divided based on the number of content sources and/or a resolution of each content source. Thus, the sum of the resolutions of the at least two display areas after the division may be lower than or equal to the resolution of the display screen.

For example, if the number of content sources is two, the output area of the display screen may be divided into two display areas. The sum of the resolutions of the two display areas may be less than or equal to the resolution of the display screen. If the resolutions of the two content sources are the same, the output area of the display screen may be divided into two display areas with the same resolution. The sum of the resolutions of the two display areas is less than or equal to the resolution of the display screen. If the resolutions of the two content sources are different, the resolution corresponding to each display area of the two display areas can be adjusted according to a ratio of the resolutions of the two display areas. The sum of the resolutions of the two display areas may be less than or equal to the resolution of the display screen.

In some other embodiments, the output area of the display screen may also be divided based on the target information of the content source provider. The target information of the content source provider may at least include type information of the provider, identification information of the provider, application information running on the provider, etc. The sum of the resolutions of the at least two display areas obtained by division may be lower than or equal to the resolution of the display screen.

For example, if content source providers include the electronic apparatus and an external smartphone, respectively, the output area of the display screen may be divided according to the type information of the providers. Since the screen of the smartphone is usually narrow, a split-screen ratio of 3:1 may be selected. ¾ of the display area may be used to display the content source from the electronic apparatus. ¼ of the display area may be used to display the content source from the smartphone.

For another example, if the content source providers include the electronic apparatus and the external smartphone, respectively, the output area of the display screen may also be divided according to the application information running on the providers. If a video playback application is running on the electronic apparatus and is displayed on a lateral screen, and a reading software is running on the smartphone and is displayed on a vertical screen, a distribution ratio of 3:1 may be selected. If video playback applications are running on both the electronic apparatus and the smartphone and are displayed in lateral screens, a split-screen ratio of 1:1 may be selected.

The output area of the display screen may be divided only based on the display screen division operation or based on a combination of the attribution information of the content source and the display division operation to obtain the at least two display areas. Moreover, when the output area of the display screen is divided into the at least two display areas, the sum of the resolutions of the at least two display areas obtained by the division may be lower than or equal to the resolution of the display screen.

For example, before the output area of the display screen is divided, the resolution of the display screen may be 3840×2160. If the output area of the display screen is determined to be divided into 3:1 split-screens according to the attribute information of the content source and/or the division operation of the display screen, the output area of the display screen may be divided into two display areas with the resolutions of 2880×2160 and 960×2160 respectively.

In addition, in some embodiments, the method may further include, after the at least one content source provider is disconnected from the first connection, controlling the wireless projection module to switch from the second state to the first state.

After the wireless projection module establishes the first connection with the at least one content source provider, the wireless projection module may be controlled to switch from the first state to the second state. Otherwise, after the wireless projection module and the at least one content source provider are disconnected from the first connection, the wireless projection module may be further controlled to switch from the second state to the first state. Since the power consumption of the wireless projection module in the first state is lower than the power consumption of the wireless projection module in the second state, the wireless projection module may enter a low power consumption mode to save power.

For example, according to the type information of the electronic apparatus, after the electronic apparatus disconnects the first connection with the at least one content source provider, if the electronic apparatus is a monitor, the display screen of the electronic apparatus may be determined to have no output content source for displaying and outputting. If the electronic apparatus is an AIO, a second display switch command may be sent to the display controller through the wireless projection module. Then, according to the second display switch command, the display controller may be configured to control the display screen of the electronic apparatus to switch contents. Thus, the display screen of the electronic apparatus may display the second content source entered by the electronic apparatus.

Embodiments of the present disclosure provide a control method. After establishing the first connection with the at least one content source provider, the wireless projection module of the electronic apparatus may be controlled to switch from the first state to the second state to display the at least one first content source that is input by the at least one content source provider to the display screen of the electronic apparatus. The power consumption of the wireless projection module in the first state may be lower than the power consumption of the wireless projection module in the second state. As such, by detecting whether the connection is established with the content source provider, the wireless projection of the electronic apparatus may be realized. Thus, the problem of the cumbersome operation caused by manually triggering the projection may be solved, and the user experience of the wireless projection may be increased. The efficiency of the wireless projection may also be improved.

In some other embodiments of the present disclosure, FIG. 3 illustrates a schematic detailed flowchart of a control method according to some embodiments of the present disclosure. As shown in FIG. 3, for example, the electronic apparatus is an AIO, and the content source provider is a smartphone. The method includes the following processes.

At S301, the wireless projection module detects a connection state of the smartphone through an underlying driver.

At S302, when the wireless projection module is not connected to the smartphone or is disconnected from the smartphone, the wireless projection module enters the first state.

At S303, when the wireless projection module establishes a connection with the smartphone, the wireless projection module switches from the first state to the second state. The first content source that is input by the smartphone is switched to be displayed on the display screen of the electronic apparatus through a Scalar chip.

At S304, when the wireless projection module is disconnected from the smartphone, the wireless projection module switches from the second state to the first state. The second content source from the electronic apparatus is switched to be displayed on the display screen of the electronic apparatus through the Scalar chip.

In embodiments of the present disclosure, the AIO may include a wireless projection module and a display controller. The wireless projection module may include a wireless connection module, a system on chip (SOC), etc. The display controller may include a power supply module, a display controller (such as a Scalar chip), etc. The wireless projection module may be connected to the display controller through several communication interfaces. Thus, the first content source that is input by the smartphone may be displayed on the display screen of the electronic apparatus.

In some embodiments, when the wireless projection module establishes the connection with the smartphone through the wireless connection module, the underlying driver on the SOC may be configured to detect the connection state of the smartphone. For example, the wireless projection module may not be connected to the smartphone, the wireless projection module may be disconnected from the smartphone, or the wireless projection module may establish connection with the smartphone, etc. Thus, the state (i.e., the first state and the second state) of the wireless projection module may be determined.

In embodiments of the present disclosure, the power consumption of the wireless projection module in the first state may be lower than the power consumption of the wireless projection module in the second state. The wireless screen projection module can be in the first state (such as the sleep state, the shutdown state, etc.), or in the second state (such as the power-on state, the operation state, etc.), which may be determined by the underlying driver to detect the connection state of the smartphone.

That is, when the wireless projection module is detected to be not connected to the smartphone or be disconnected from the smartphone, the wireless projection module may enter a low power consumption mode. That is, the wireless projection module may enter the first state. Once the wireless projection module is detected to be connected to the smartphone, the wireless projection module can be automatically woken up at this time. The wireless projection module may be controlled to switch from the first state to the second state. The Scalar chip may be triggered to switch the first content source that is input by the smartphone to be displayed on the display screen of the electronic apparatus. Further, when the wireless projection module is detected to be disconnected from the smartphone, the wireless projection module may be controlled to enter the low-power consumption mode again. Moreover, the Scalar chip may be triggered to switch the second content source from the electronic apparatus to be displayed on the display screen of the electronic apparatus again.

Embodiments of the present disclosure provide the control method. The specific implementation of embodiments of the present disclosure is described in detail above. By detecting whether the connection is established with the content source provider, the wireless projection of the electronic apparatus may be realized. Thus, the problem of the cumbersome operation caused by manually triggering the projection may be solved, and the user experience of the wireless projection may be increased. The efficiency of the wireless projection may also be improved.

In some other embodiments of the present disclosure, FIG. 4 illustrates a schematic structural diagram showing hardware of an electronic apparatus 40 according to some embodiments of the present disclosure. As shown in FIG. 4, the electronic apparatus 40 includes a wireless projection module 401, a display control module 402, and a display screen 403.

The wireless projection module 401 may be configured to control the electronic apparatus to switch from the first state to the second state after establishing the first connection with the at least one content source provider;

The display control module 402 may be configured to display the at least one first content source that is input by the at least one content source provider to the display screen 403.

In embodiments of the present application, the power consumption of the wireless projection module 402 in the first state may be lower than the power consumption of the wireless projection module 402 in the second state.

In some embodiments, the wireless projection module 401 may include a processing chip and a first communication interface.

The processing chip may be configured to generate a projection command after the first connection is detected to be established with the at least one content source provider.

The first communication interface may be configured to send the projection command to the display control module 402.

The display control module 402 may be configured to control the at least one first content source that is input by the at least one content source provider to be displayed to the display screen 403 by the display controller according to the projection command.

In some embodiments, the wireless projection module 401 may further include a second communication interface The processing chip may be further configured to obtain the at least one first content source that is input by the at least one content source provider after the first connection is detected to be established with the at least one content source provider.

The second communication interface may be configured to send the at least one first content source that is input by the at least one content source provider to the display controller;

The display control module 402 may be further configured to display the at least one first content source that is input by the at least one content source provider to the display screen 403 by the display controller after receiving the at least one first content source that is input by the at least one content source provider.

In some embodiments, the wireless projection module 401 may further include a third communication interface.

The processing chip may be further configured to generate a touch control instruction based on the display screen operation trajectory acting on the content source provider.

The third communication interface may be configured to send the touch control instruction to the display screen of the electronic apparatus to display and adjust the content source that is input by the content source provider.

In some embodiments, the wireless projection module 401 may further include a wireless connection module.

The wireless connection module may be configured to establish the first connection with the at least one content source provider.

In embodiments of the present disclosure, the first communication interface may be a general-purpose input/output (GPIO) interface. The second communication interface may be a high-definition multimedia interface (HDMI). The third communication interface may be a universal serial bus (USB) interface.

In embodiments of the present disclosure, the wireless connection module may include a WIFI connection function and/or a Bluetooth connection function. The processing chip may include a SOC. In addition, the display controller (such as a Scalar chip) may be included in the display module. Thus, the at least one first content source that is input by the at least one content source provider may be displayed to the display screen of the electronic apparatus.

In some embodiments, for the electronic apparatus 40, FIG. 5 illustrates a schematic appearance structural diagram of the electronic apparatus according to some embodiments of the present disclosure. Compared with the appearance structure shown in FIG. 1, since a button is required for screen switching in the existing technology, the user experience is affected. However, In embodiments of the present disclosure, the button is no longer needed, which can not only reduce the cost, but also do not affect the ID of the electronic apparatus.

Figure 6:
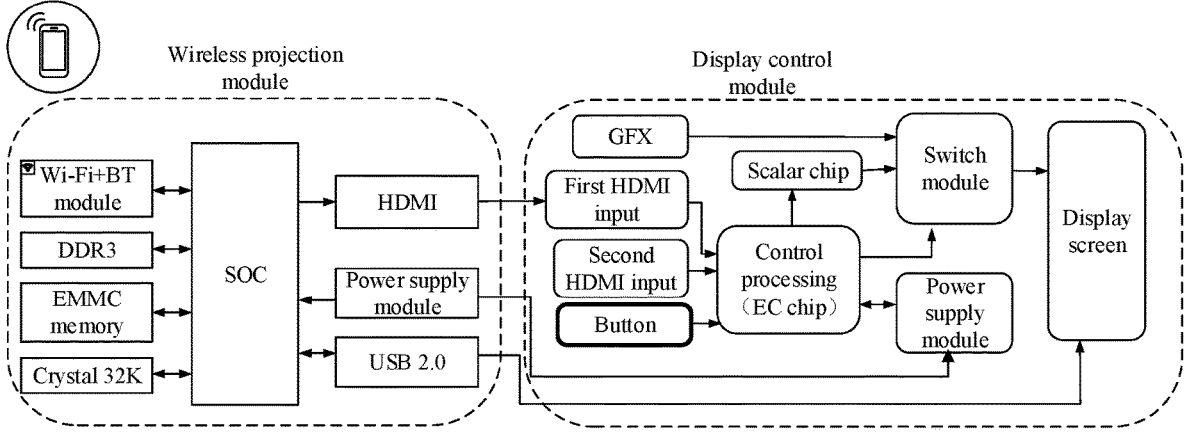
FIG. 6 illustrates a schematic logical architectural diagram of an electronic apparatus according to related technology.
Figure 7:
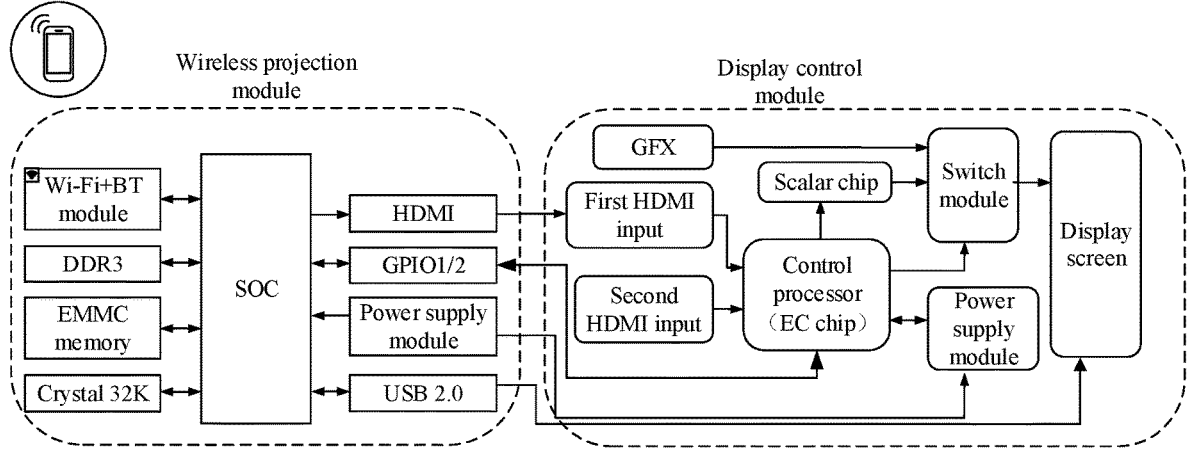
FIG. 7 illustrates a schematic logical architectural diagram of an electronic apparatus according to some embodiments of the present disclosure.

Correspondingly, FIG. 6 illustrates a schematic logical architectural diagram of an electronic apparatus according to related technology. FIG. 7 illustrates a schematic logical architectural diagram of the electronic apparatus according to some embodiments of the present disclosure. According to a comparison between FIG. 6 and FIG. 7, a button is required in the existing technology. The logical architecture of embodiments of the present disclosure is described in detail below by taking FIG. 7 as an example.

As shown in FIG. 7, the logical architecture includes a wireless projection module, a display control module, and a display screen (Panel Touch). The wireless projection module may include a WIFI+BT module, a 3rd double data rate (DDR3) memory, an embedded multi media card (EMMC) memory, a 32K crystal (Crystal 32K), a SOC chip, an HDMI interface, a GPIO1/2 interface, a power supply module, and an USB2.0 interface. The display control module may include a control processor (EC chip), a Scalar chip, a switch module, a power supply module, a first HDMI input interface (HDMI in), a second HDMI input interface (HDMI in), a graphics force express (GFX), and a power supply module.

In FIG. 7, the wireless projection module establishes the connection with the content source provider (such as a smartphone) through the WIFI+BT module. The HDMI interface of the wireless projection module is connected to the first HDMI input interface of the display control module. The GPIO1/2 interface of the wireless projection module is connected to the control processor (EC chip) of the display control module. The power supply module of the wireless projection module is connected to the power supply module of the display control module. The USB2.0 interface of the wireless projection module is connected to the display screen (Panel Touch). One of the first HDMI input interface and the second HDMI input interface of the display control module may be configured to realize a wired connection, and the other one of the first HDMI input interface and the second HDMI input interface of the display control module may be configured to realize a wireless connection. Both the first HDMI input interface and the second HDMI input interface of the display control module may be connected to the control processor (EC chip) to transmit the first content source that is input by the content source provider (e.g., the smartphone) to the control processor (EC chip). The USB 2.0 interface may be mainly configured to send a control signal of an operation of a mouse, a keyboard, and a touch screen to the display screen to perform projection adjustment on the first content source that is input by the content source provider (e.g., smartphone) at the display screen.

In FIG. 7, the power supply module of the display control module may be configured to supply power to the control processor (EC chip) and the wireless projection module. The power supply module usually provides a voltage of 5V. However, the voltage required by each module of the wireless projection module may not be necessarily 5V. Therefore, the wireless projection module also includes a power supply module, which is configured to convert the 5V voltage into a target voltage required by each module, e.g., 1.8V, 3V, etc.

Compared to the existing technology, a group of GPIO1/2 interfaces are added in FIG. 7 of embodiments of the present disclosure. As such, when the connection with the content source provider (such as a smartphone) is detected through the WIFI+BT module, the wireless projection module may send the first display switch command to the display control module through the GPIO1/2 interfaces. Thus, the Scalar chip may control the switch module to switch the content of the display screen and display and output the first content source that is input by the content source provider (such as a smartphone) to the display screen. Once the connection with the content source provider (such as a smartphone) is detected to be disconnected through the WIFI+BT module, the wireless projection module may also send a second display switch command to the display control module through the GPIO1/2 interfaces. Thus, the Scalar chip may control the switch module to switch the content of the display screen to display the second content source from the electronic apparatus to the display screen.

In addition, with reference to FIG. 7, for different types of information of the electronic apparatus, FIG. 7 shows an example that electronic apparatus is an AIO. When the connection is detected to be established with the content source provider (such as a smartphone) by the WIFI+BT module, the wireless projection module may send a command to the control processor (EC chip) through the GPIO1/2 interface. Thus, the Scalar chip may control the switch module to switch the content of the display screen. As such, the display screen may be controlled to switch from displaying and outputting the second content source from the electronic apparatus to displaying and outputting the first content source that is input by the content source provider (such as a smartphone). In addition, if the electronic apparatus is a monitor, the display control module in FIG. 7 may no longer need the Scalar chip and the switch module. Thus, when the WIFI+BT module detects that the connection is established with the content source provider (such as a smartphone), the wireless projection module may send the command to the control processor (EC chip) through the GPIO1/2 interface to control the display screen to display the first content source.

Figure 8:
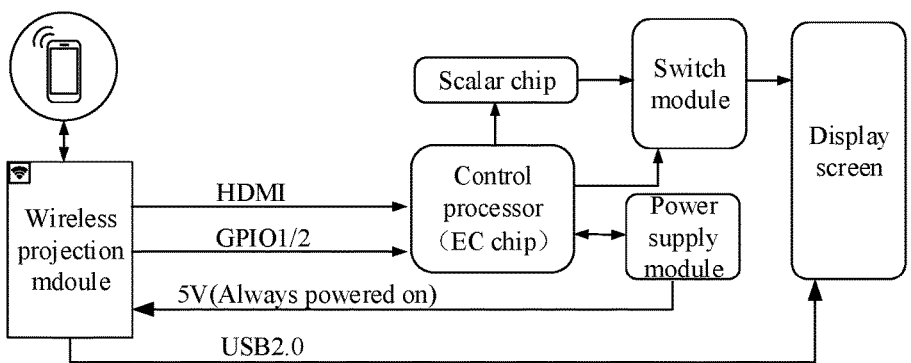
FIG. 8 illustrates a schematic logical block diagram of an electronic apparatus according to some embodiments of the present disclosure.

Further, according to the logical architecture shown in FIG. 7, FIG. 8 illustrates a schematic logical block diagram of the electronic apparatus according to some embodiments of the present disclosure. As shown in FIG. 8, on one hand, the wireless projection module establishes the connection with the content source provider (such as a smartphone). On the other hand, the wireless projection module sends the first content source that is input by the content source provider (such as the smartphone) to the control processor (EC chip) through the HDMI interface. The wireless projection module sends the first display switch command or the second display switch command to the control processor (EC chip) through the GPIO1/2 interface. The wireless projection module sends the control signal of an operation of the mouse, the keyboard, and the touch screen to the display screen through the USB2.0 interface. In addition, the power supply module may be configured to supply power (such as 5V voltage) to the wireless projection module. Thus, the wireless projection module is always powered on.

That is, taking the content source provider being a smartphone as an example, the wireless projection module may automatically detect the connection state of the smartphone through the underlying driver. When the wireless projection module is not connected to the smartphone or disconnected from the smartphone, the wireless projection module may automatically enter the low power consumption mode. When the wireless projection module is detected to be connected to the smartphone, the wireless projection module may be automatically woken up. As such, when the smartphone is connected to the wireless projection module, the wireless projection module may automatically trigger the electronic apparatus to cause the Scalar chip inside the wireless projection module to automatically switch to the wireless projection function. That is, the Scalar chip may switch the first content source that is input by the smartphone to be displayed at the display screen of the electronic apparatus. When the smartphone is disconnected from the wireless projection module or not connected, the wireless projection module may automatically trigger the electronic apparatus to cause the Scalar chip inside the wireless screen projection module to automatically switch to the Windows interface of the electronic apparatus. That is, the Scalar chip may switch the second content source from the electronic apparatus to be displayed on the display screen of the electronic apparatus.

Embodiments of the present disclosure provide the logical architecture of the electronic apparatus. The specific implementation of embodiments of the present disclosure is described in detail above. By detecting whether the connection is established with the content source provider, the wireless projection of the electronic apparatus may be realized. Thus, the problem of a cumbersome operation caused by manually triggering the projection may be solved, which can not only reduce cost but also increase the user experience of the wireless projection. The efficiency of the wireless projection may also be improved.

Figure 9:
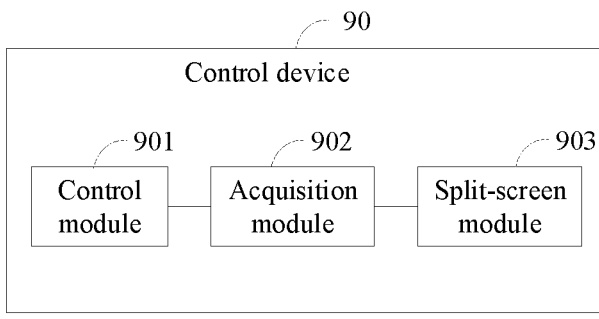
FIG. 9 illustrates a schematic structural diagram of a control device according to some embodiments of the present disclosure.

In some other embodiments of the present disclosure, FIG. 9 illustrates a schematic structural diagram of a control device 90 according to some embodiments of the present disclosure. As shown in FIG. 9, the control device 90 includes a control module 901.

The control module 901 may be configured to control the wireless projection module of the electronic apparatus to switch from the first state to the second state after establishing the first connection with the at least one content source provider to display the at least one first content source that is input from by the at least one content source provider to the display screen of the electronic apparatus. The power consumption of the wireless projection module in the first state may be lower than the power consumption of the wireless projection module in the second state.

In some embodiments, the control module 901 may be further configured to establish the second connection with the at least one content source provider using the first connection. The power consumption of the electronic apparatus in the first connection may be lower than the power consumption of the electronic apparatus in the second connection. In some other embodiments, the control module 901 may be further configured to establish the second connection with the at least one content source provider to establish the first connection using the second connection. The power consumption of the electronic apparatus in the second connection may be lower than the power consumption of the electronic apparatus in the first connection.

In some embodiments, as shown in FIG. 9, the control device 90 further includes an acquisition module 902. The acquisition module 902 may be configured to obtain an input operation acting on the electronic apparatus. If an association relationship exists between the input operation and the establishment of the first connection and/or the second connection, the wireless projection module of the electronic apparatus may be controlled to switch from the first state to the second state.

In some other embodiments, the acquisition module 902 may be further configured to obtain the communication content information between the at least one content source provider and the electronic apparatus. Based on the communication content information, the wireless projection module of the electronic apparatus may be controlled to switch from the first state to the second state, or the wireless projection screen module of the electronic apparatus may remain in the first state.

In some embodiments, the control module 901 may be further configured to control the operation state of the electronic apparatus to display the at least one first content source that is input by the at least one content source provider to the display screen of the electronic apparatus.

In some embodiments, controlling the operation state of the electronic apparatus may include at least one of controlling the operation state of the electronic apparatus based on the type of the electronic apparatus and/or the state of the display screen or controlling the operation state of the electronic apparatus based on the input information acting on the electronic apparatus.

In some embodiments, the control module 901 may be further configured to, if the display screen of the electronic apparatus is in the third state, control the display screen of the electronic apparatus to switch from the third state to the fourth state to display the first content source to the display screen. The power consumption of the display screen in the third state may be lower than the power consumption of the display screen in the fourth state.

In some other embodiments, the control module 901 may be further configured to, if the display screen of the electronic apparatus is in the fourth state, obtain the type information of the electronic apparatus to control the display screen of the electronic apparatus to display the first content source based on the type information, or control the display screen of the electronic apparatus to switch from displaying and outputting the second content source to displaying and outputting the first content source. The second content source may be from the electronic apparatus. The first content source may be from the content source provider.

In some embodiments, the control module 901 may be further configured to control the display screen of the electronic apparatus to switch from the fourth state to the split-screen state based on the content source information that is input by the at least one content source provider and/or the split-screen operation acting on the electronic apparatus to display the at least one first content source to the split-screen area of the display screen.

In some other embodiments, the control module 901 may be further configured to control the display screen of the electronic apparatus to display the first content source based on the connection request information that is input by the at least one content source provider.

In some other embodiments, the control module 901 may be further configured to control the display screen of the electronic apparatus to switch from displaying and outputting the second content source to displaying and outputting the first content source. The second content source may be from the electronic apparatus. The first content source may be from the content source provider.

In some embodiments, as shown in FIG. 9, the control device 90 further includes a split-screen module 903. The split-screen module 903 may be configured to, if an input from the at least one content source provider is obtained, divide the output area of the display screen into the at least two display areas based on the number of and/or resolutions of the first content sources that are input by the at least one content source provider.

In some other embodiments, the split-screen module 903 may be further configured to, if a display screen division operation is obtained, determine that the split-screen operation of the electronic apparatus is obtained and divide the output area of the display screen into the at least two display areas based on the display screen division operation.

In some other embodiments, the split-screen module 903 may be further configured to, if an operation of creating at least two desktops on the display screen is obtained, determine that the split-screen operation of the electronic apparatus is obtained and divide the output area of the display screen into the at least two display areas.

In some other embodiments, the split-screen module 903 may be further configured to, if an operation of switching display resolution of the display screen is obtained, determine that the split-screen operation of the electronic apparatus is obtained and divide the output area of the display screen into at least two display areas.

In some other embodiments, the split-screen module 903 may be further configured to, if inputs of at least two content sources are obtained, and a division operation acting on the display screen is obtained, determine that the screen division operation of the electronic apparatus is obtained and divide the output area of the display screen into at least two display areas based on the division operation.

In some embodiments, the control module 901 may be further configured to control the wireless projection module to switch from the second state to the first state after the first connection is disconnected from the at least one content source provider.

In embodiments of the present disclosure, "unit" may be a part of a circuit, a part of a processor, a part of a program or software, etc. The "unit" may be a module or non-modular. Moreover, components of embodiments of the present disclosure may be integrated into one processing unit, or each unit may exist physically alone, or two or more units may be integrated into one unit. The above-integrated unit may be implemented in the form of hardware or in the form of software functional modules.

If the integrated unit is implemented in the form of a software functional module and is not sold or used as an independent product, the integrated unit may be stored in a computer-readable storage medium. The technical solutions of embodiments of the present disclosure may be essential or a part of the technical solution that contributes to the existing technology, or the whole or part of the technical solutions may be embodied in the form of a software product. The computer software product may be stored in a storage medium and include several instructions. The instructions may be used to cause a computer apparatus (e.g., a personal computer, a server, or a network apparatus, etc.) or a processor to execute all or part of the steps of the method of embodiments in the present disclosure. The storage medium may include a U disk, a removable hard disk, a read only memory (ROM), a random access memory (RAM), a magnetic disk, an optical disk, or other media that can store program codes.

Therefore, embodiments of the present disclosure provide a computer storage medium. The computer storage medium stores a computer program that, when executed by at least one processor, implements steps of any one method in embodiments of the present disclosure.

Figure 10:
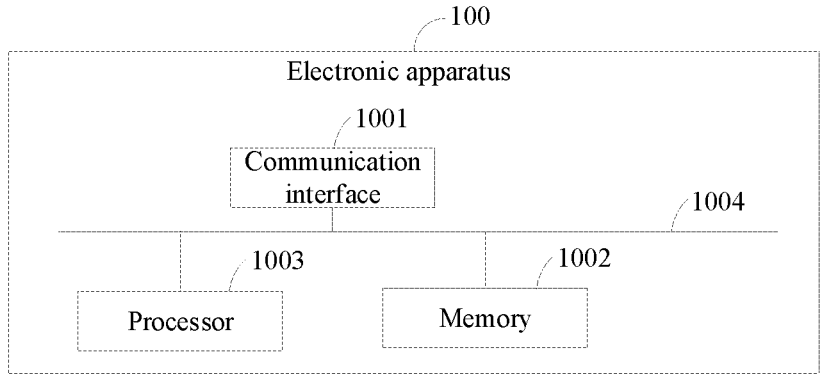
FIG. 10 illustrates a schematic structural diagram of an electronic apparatus according to some embodiments of the present disclosure.

Based on the above-mentioned composition of the control device 90 and the computer storage medium, FIG. 10 illustrates a schematic structural diagram of an electronic apparatus 100 according to some embodiments of the present disclosure. As shown in FIG. 10, the electronic apparatus 100 includes a communication interface 1001, a memory 1002, and a processor 1003. The various components are coupled together through a bus system 1004. The bus system 1004 may be configured to implement connection and communication among these components. In addition to the data bus, the bus system 1004 also includes a power bus, a control bus, and a state signal bus. However, for clarity, the various buses are labeled as the bus system 1004 in FIG. 10. The communication interface 1001 may be configured to receive and send a signal in a process of sending and receiving information with another external network element.

The memory 1002 may be used to store the computer program that can run on the processor 1003.

The processor 1003 may be configured to, when running the computer program, after establishing the first connection with the at least one content source provider, control the wireless projection module of the electronic apparatus to switch from the first state to the second state to display the at least one first content source that is input by the at least one content source provider on the display screen of the electronic apparatus.

The power consumption of the wireless projection module in the first state may be lower than the power consumption of the wireless projection module in the second state.

The memory 1002 of embodiments of the present disclosure may include a volatile memory or a non-volatile memory, or both volatile and non-volatile memory. The non-volatile memory may include a read-only memory (ROM), a programmable read-only memory (PROM), an erasable programmable read-only memory (EPROM), an electrical programmable read-only memory (EPROM), an electrically EPROM (EEPROM), or a flash memory. The volatile memory may include a random access memory (RAM), which may be used as an external cache. With the exemplary and non-limited description, many forms of RAM are available, such as a Static RAM (SRAM), a dynamic RAM (DRAM), a synchronous DRAM (SDRAM), a double data rate SDRAM (DDRSDRAM), an enhanced SDRAM (ESDRAM), a synchronous link DRAM (SLDRAM), and a direct rambus RAM (DRRAM). The memory 1002 of the systems and methods described herein is intended to include, but not be limited to, these and any other suitable types of memory.

The processor 1003 may include an integrated circuit chip with signal processing capability. In an implementation process, steps of the above methods may be completed by the integrated logical circuit of the hardware of the processor 1003 or the instruction of the software form. The above processor 1003 may include a general-purpose processor, a digital signal processor (DSP), an application-specific integrated circuit (ASIC), a field-programmable gate array (FPGA), or other programmable logic devices, discrete gate or transistor logic devices, and discrete hardware components. The methods, steps, and logic block diagrams disclosed in embodiments of the present disclosure may be implemented or executed. The general-purpose processor may include a microprocessor or the processor may be any conventional processor. The steps of the methods disclosed in connection with embodiments of the present disclosure may be directly executed by a hardware decoding processor or by a combination of hardware and software modules in the decoding processor. The software module may be located in the RAM, the flash memory, the ROM, the programmable read-only memory or electrically erasable programmable memory, the register, and other storage media well known in the existing technology. The storage medium may be located in the memory 1002. The processor 1003 may be configured to read the information in the memory 1002 and complete the steps of the above methods in combination with the hardware.

Embodiments described herein may be implemented by hardware, software, firmware, middleware, microcode, or a combination thereof. For hardware implementation, the processing unit can be implemented in one or more application-specific integrated circuits (ASIC), digital signal processing (DSP), a digital signal processing device (DSPD), a programmable logic device (PLD), a field-programmable gate array (FPGA), a general-purpose processor, a controller, a microcontroller, a microprocessor, or other electronic elements or a combination of the other electronic elements that are configured to execute the function of the present disclosure.

For a software implementation, the technology described herein may be implemented by executing the functional modules (e.g., procedures, functions, etc.). Software codes may be stored in memory and executed by the processor. The memory may be implemented in the processor or external to the processor.

In some other embodiments, the processor 1003 may be further configured to execute the method described in any one of embodiments of the present disclosure when running the computer program.

Figure 11:
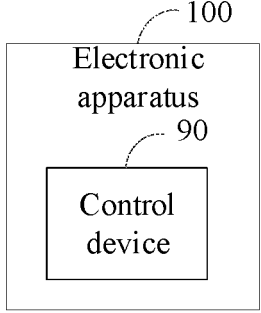
FIG. 11 illustrates a schematic structural diagram of another electronic apparatus according to some embodiments of the present disclosure.

Based on the composition of the control device 90 and the computer storage medium, FIG. 11 illustrates a schematic structural diagram of another electronic apparatus 100 according to some embodiments of the present disclosure. As shown in FIG. 11, the electronic apparatus 100 includes at least the control device 90 described in any one of embodiments of the present disclosure.

For the electronic apparatus 100, after establishing the first connection with the at least one content source provider, the wireless projection module of the electronic apparatus may be controlled to switch from the first state to the second state to display the at least one first content source that is input by the at least one content source provider to to the display screen of the electronic apparatus. As such, by detecting whether to establish the connection with the content source provider, the wireless projection of the electronic apparatus may be realized. Thus, the problem of a cumbersome operation caused by manually triggering the projection may be solved, which can not only reduce cost but also increase the user experience of the wireless projection. The efficiency of the wireless projection may also be improved.

The above describes only some embodiments of the present disclosure and is not intended to limit the scope of the present disclosure.

In the present disclosure, the terms "comprising," "comprising," or any other variation thereof are intended to encompass non-exclusive inclusion, such that a process, method, article, or device comprising a series of elements includes not only those elements but also other elements not expressly listed or inherent to such a process, method, article, or device. Without further limitation, an element defined by the phrase "comprising a . . . " does not exclude the presence of additional identical elements in the process, method, article, or device that includes the element.

The above-mentioned sequence numbers of embodiments of the present disclosure are only for description and do not represent the advantages or disadvantages of embodiments of the present disclosure.

The methods disclosed in several method embodiments of the present disclosure may be arbitrarily combined when there is no conflict to obtain new method embodiments.

The features disclosed in several product embodiments of the present disclosure may be combined arbitrarily when there is no conflict to obtain new product embodiments.

The features disclosed in several method or apparatus embodiments of the present disclosure may be combined arbitrarily when there is no conflict to obtain new method embodiments or device embodiments.

The above are only some embodiments of the present disclosure. However, the scope of the present disclosure is not limited to this. Those skilled in the art may easily think of modifications or replacements within the technical scope of the present disclosure. These modifications and replacements should be within the scope of the present disclosure. Therefore, the scope of the present invention should be subject to the scope of the claims.

What is claimed is:

1. A control method, comprising:
after establishing a first connection with a content source provider, controlling a wireless projection module of an electronic apparatus to switch from a first state to a second state, wherein power consumption of the wireless projection module in the first state is lower than power consumption of the wireless projection module in the second state;
controlling an operation state of the electronic apparatus to display a first content that is input by the content source provider to a display screen, including:
in response to a state of the display screen of the electronic apparatus being a black screen state, controlling the display screen of the electronic apparatus to switch from the black screen state to a bright screen state; and
in response to the state of the display screen of the electronic apparatus being the bright screen state:
in response to a type of the electronic apparatus being a monitor, controlling the display screen of the electronic apparatus to display the first content from the content source provider only; and
in response to the type of the electronic apparatus being an all-in-one (AIO) computer, controlling the display screen of the electronic apparatus to simultaneously display a second content from the electronic apparatus and the first content from the content source provider with a split-screen state; and
after disconnecting the first connection from the content source provider, controlling the wireless projection module to switch from the second state to the first state.

2. The method of claim 1, further comprising:
controlling the operation state of the electronic apparatus based on input information from the electronic apparatus.

3. The method of claim 2, wherein controlling the operation state of the electronic apparatus based on the input information from the electronic apparatus further includes:
controlling the display screen of the electronic apparatus to switch from a fourth state to the split-screen state based on content source information that is input by the content source provider and/or a split-screen operation from the electronic apparatus to display the first content to a split-screen area of the display screen; or
controlling the display screen of the electronic apparatus to display the first content based on connection request information that is input by the content source provider; or
controlling the display screen of the electronic apparatus to switch from displaying and outputting the second content to displaying and outputting the first content.

4. The method of claim 3, wherein controlling the display screen of the electronic apparatus to switch from the fourth state to the split-screen state based on the content source information that is input by the content source provider and/or the split-screen operation from the electronic apparatus includes:
in response to an input of the content source provider being obtained, dividing the output area of the display screen into at least two display areas based on a number of and/or a resolution of the first content; or
in response to a display screen division operation being obtained, determining that the split-screen operation of the electronic apparatus is obtained, and dividing the output area of the display screen into the at least two display areas based on the display screen division operation; or
in response to an operation of creating two desktops on the display screen being obtained, determining that the split-screen operation of the electronic apparatus is obtained, and dividing the output area of the display screen into the at least two display areas.

5. The method of claim 1, wherein controlling the operation state of the electronic apparatus further includes:
in response to an input operation to switch a display resolution of the display screen from a first resolution to a second resolution different from the first resolution, determining that a split-screen operation of the electronic apparatus is obtained, and dividing an output area of the display screen into the at least two display areas.

6. The method of claim 1, further comprising:
obtaining communication content information between the content source provider and the electronic apparatus, and based on the communication content information, maintaining the wireless projection module of the electronic apparatus in the first state.

7. The method of claim 1, further comprising:
establishing a second connection with the content source provider by using the first connection, power consumption of the electronic apparatus in the first connection being lower than power consumption of the electronic apparatus in the second connection; or
establishing the second connection with the content source provider to establish the first connection using the second connection, the power consumption of the electronic apparatus in the second connection being lower than the power consumption of the electronic apparatus in the first connection.

8. The method of claim 7, further comprising:
obtaining an input operation from the electronic apparatus, and in response to the input operation being associated with the first connection and/or the second connection, controlling the wireless projection module of the electronic apparatus to switch from the first state to the second state; or obtaining communication content information between the content source provider and the electronic apparatus, and based on the communication content information, controlling the wireless projection module of the electronic apparatus to switch from the first state to the second state, or maintaining the wireless projection module of the electronic apparatus in the first state.

9. The method of claim 1, wherein:

the first connection is a Bluetooth connection; and after establishing the first connection with the content source provider, controlling the wireless projection module of the electronic apparatus to switch from the first state to the second state includes:

after establishing the Bluetooth connection with the content source provider, establishing a Wireless Fidelity (WIFI) connection with the content source provider through the Bluetooth connection; and after the WIFI connection is established with the content source provider, controlling the wireless projection module of the electronic apparatus to switch from the first state to the second state.

10. The method of claim 1, wherein:

the first connection is a Bluetooth connection;

after establishing the first connection with the content source provider, controlling the wireless projection module of the electronic apparatus to switch from the first state to the second state includes:

after establishing the Bluetooth connection with the content source provider, controlling the wireless projection module of the electronic apparatus to switch from the first state to the second state; and after the wireless projection module of the electronic apparatus is switched to the second state, establishing a Wireless Fidelity (WIFI) connection with the content source provider through the Bluetooth connection; and controlling the operation state of the electronic apparatus to display the first content that is input by the content source provider to the display screen includes:

after the WIFI connection is established with the content source provider, controlling the display screen of the electronic apparatus to display the first content through the WIFI connection.

11. A control device, comprising: a memory storing computer program instructions; and a processor coupled to the memory and configured to execute the computer program instructions to:

after establishing a first connection with a content source provider, control a wireless projection module of an electronic apparatus to switch from a first state to a second state, wherein power consumption of the electronic apparatus in the first state is lower than power consumption of the electronic apparatus in the second state;

control an operation state of the electronic apparatus to display a first content that is input by the content source provider to a display screen, including:

in response to a state of the display screen of the electronic apparatus being a black screen state, controlling the display screen of the electronic apparatus to switch from the black screen state to a bright screen state; and in response to the state of the display screen of the electronic apparatus being the bright screen state:

in response to a type of the electronic apparatus being a monitor, controlling the display screen of the electronic apparatus to display the first content from the content source provider only; and in response to the type of the electronic apparatus being an all-in-one (AIO) computer, controlling the display screen of the electronic apparatus to simultaneously display a second content from the electronic apparatus and the first content from the content source provider with a split-screen state; and after disconnecting the first connection from the content source provider, control the wireless projection module to switch from the second state to the first state.

12. The device of claim 11, wherein the processor is further configured to execute the computer program instructions to:

control the operation state of the electronic apparatus based on input information from the electronic apparatus.

13. The device of claim 12, wherein the processor is further configured to execute the computer program instructions to:

control the display screen of the electronic apparatus to switch from a fourth state to the split-screen state based on content source information that is input by the content source provider and/or a split-screen operation from the electronic apparatus to display the first content to a split-screen area of the display screen; or control the display screen of the electronic apparatus to display the first content based on connection request information that is input by the content source provider; or control the display screen of the electronic apparatus to switch from displaying and outputting the second content to displaying and outputting the first content.

14. The device of claim 13, wherein the processor is further configured to execute the computer program instructions to:

in response to an input of the content source provider being obtained, divide the output area of the display screen into at least two display areas based on a number of and/or a resolution of the first content; or in response to a display screen division operation being obtained, determine that the split-screen operation of the electronic apparatus is obtained, and divide the output area of the display screen into the at least two display areas based on the display screen division operation; or in response to an operation of creating two desktops on the display screen being obtained, determine that the split-screen operation of the electronic apparatus is obtained, and divide the output area of the display screen into the at least two display areas.

15. The device of claim 11, wherein the control module is further configured to:

establish a second connection with the content source provider by using the first connection, power consumption of the electronic apparatus in the first connection being lower than power consumption of the electronic apparatus in the second connection; or, establish the second connection with the content source provider to establish the first connection using the second connection, the power consumption of the electronic apparatus in the second connection being lower than the power consumption of the electronic apparatus in the first connection.

16. The device of claim 15, wherein the processor is further configured to execute the computer program instructions to:

obtain an input operation from the electronic apparatus, and in response to the input operation being associated with the first connection and/or the second connection, control the electronic apparatus to switch from the first state to the second state; or obtain communication content information between the content source provider and the electronic apparatus, and based on the communication content information, control the electronic apparatus to switch from the first state to the second state, or maintain the electronic apparatus in the first state.

17. An electronic apparatus, comprising:

a wireless module;

a display screen; and a control device, the control device including: a memory storing computer program instructions; and a processor coupled to the memory and configured to execute the computer program instructions to:

after establishing a first connection with a content source provider, control the wireless projection module to switch from a first state to a second state, wherein power consumption of the electronic apparatus in the first state is lower than power consumption of the electronic apparatus in the second state;

control an operation state of the electronic apparatus to display a first content that is input by the content source provider to the display screen, including:

in response to a state of the display screen of the electronic apparatus being a black screen state, controlling the display screen of the electronic apparatus to switch from the black screen state to a bright screen state; and in response to the state of the display screen of the electronic apparatus being the bright screen state:

in response to a type of the electronic apparatus being a monitor, controlling the display screen of the electronic apparatus to display the first content from the content source provider only; and in response to the type of the electronic apparatus being an all-in-one (AIO) computer, controlling the display screen of the electronic apparatus to simultaneously display a second content from the electronic apparatus and the first content from the content source provider with a split-screen state; and after disconnecting the first connection from the content source provider, control the wireless projection module to switch from the second state to the first state.

* * * * *